Oct. 11, 1966 W. F. JEHN 3,278,155
HIGH THRUST VALVE ACTUATOR
Original Filed Jan. 24, 1962

INVENTOR
WERNER F. JEHN
BY
ATTORNEY

United States Patent Office 3,278,155
Patented Oct. 11, 1966

3,278,155
HIGH THRUST VALVE ACTUATOR
Werner F. Jehn, 438 Twinning Drive, Dayton, Ohio
Original application Jan. 24, 1962, Ser. No. 168,558, now Patent No. 3,160,391, dated Dec. 8, 1964. Divided and this application Aug. 7, 1964, Ser. No. 388,334
3 Claims. (Cl. 251—254)

This is a divisional application of the continuation-in-part application Valve Seats For High Temperature and High Vacuum Environments, Serial No. 168,558, filed January 24, 1962, and now United States Patent No. 3,160,391; the parent application being Serial No. 93,812, filed March 6, 1961, now abandoned.

The invention described herein may be manufactured and used by or for the United States Government for governmental purposes without the payment to me of any royalty thereon.

This invention relates to high thrust actuation devices, and more specifically to such actuators which are adaptable for use on valves having foil faced valve seats as disclosed in the above referenced continuation-in-part application.

As is believed to have been adequately discussed in the co-pending continuation-in-part application, the improved foil valve seats function primarily because sufficient thrust is applied on the valve plug engaging the foil valve seat, to plasticize a portion of the foil which fills all microscopic crevices in the plug. As was also discussed in the continuation-in-part application, because of the peculiar use to which valves using the new foil valve seats are placed, this extremely high thrust must be generated with a minimum amount of applied actuating torque.

Although not limited to such use, and for purposes of illustration, the actuator constituting this invention will be shown and described in connection with bakeable valves such as are used in high temperature, high vacuum applications. Such valves, to which the present actuator are applied, are made in two separable portions; (1) a valve unit having a normally open valve plug and valve seat, and sealed to form an integral flow section of the vacuum apparatus to which it is joined, and (2) an actuating unit, such as the actuator constituting this invention, which may be removably joined to the valve unit to close the valve plug against its seat; after which the internal elements of the actuator apply a high thrust against the valve plug.

One object of the present invention is to provide an actuator capable of generating an extremely high thrust in relation to the applied torque.

Another object of the present invention is to provide an actuator which is capable of generating high thrust with a minimum of internal friction losses.

A further object of the present invention is to provide a detachable high thrust actuator suitable for use on bakeable valves.

Figure 1:
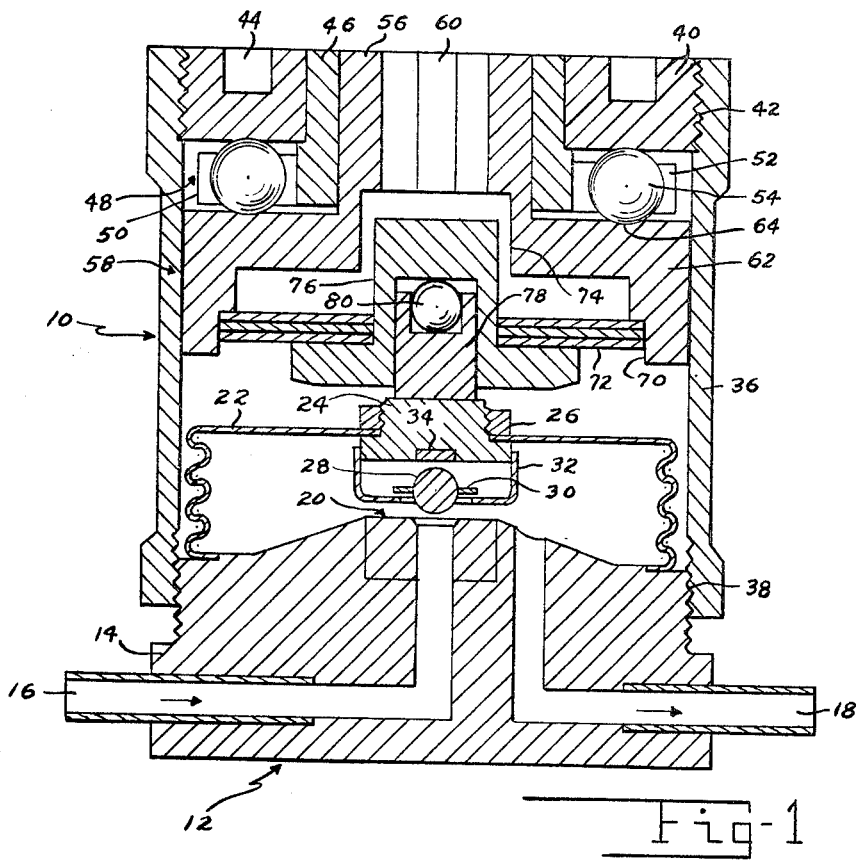
Figure 2:
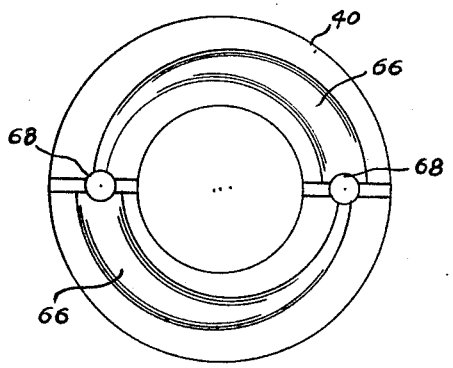

Additional objects, advantages and features of the invention reside in the construction, arrangement and combination of parts involved in the embodiment of the invention as will appear from the following description and accompanying drawing, wherein, FIG. 1 is a cross sectional elevation of the valve actuator engaging the valve unit of a typical bakeable valve before the engagement is sufficient to close the valve plug against the valve seat, and FIG. 2 is an inverted plan view in reduced scale along line 2—2 on FIG. 1 and showing the ball races in the upper bearing race.

Referring to FIG. 1 of the drawing, the present actuator 10 is shown applied to a bakeable valve unit 12. The valve unit has a body 14, containing flow passages 16 and 18, and a valve seat assembly 20 having a body ring with a foil member diffusion bonded thereto in accordance with the referenced application Serial No. 168,558. The valve unit further has an upward extending closed end bellows 22 with the open end brazed or otherwise joined in a leak-proof manner to body 14. A valve plug carrier 24 extends through an opening at the axis of the bellows where it is retained by nut 26. A spherical valve plug 28, preferably of tungsten carbide, is carried by washer 30 to which it is joined. The valve plug and washer are retained by ferrule 32 which may be brazed or spot welded to the valve plug carrier 24 in such manner as will permit free axial and lateral movement of the valve plug and attached washer. A wear resistant disc 34 of tungsten carbide is inserted into the bottom face of the valve plug carrier.

The actuator 10, constituting this invention, has a sleeve 36 having means at the lower end for engaging with the valve unit 12. The engaging means may be threads 38, as shown; or may be other well known means, such as a bayonet lock. The remaining elements of the actuator are all housed within the sleeve. The upper bearing race 40, in the form of a disc, has external threads 42 which engage like internal threads at the upper end of sleeve 36. Holes 44 may be provided to facilitate wrenching the bearing race into place with a pin wrench. The upper bearing race is bored to slidably receive the hub 46 of bearing retainer 48. The bearing retainer has a flange 50 containing diametrically opposing slots 52 for harboring and guiding balls 54. The hub 46 of bearing retainer 48 is bored to slidably receive hub 56 of the lower bearing race 58. The hub 56 is provided with an opening 60, such as a hex opening for receiving a wrench used to rotate the lower bearing race. The lower bearing race 58 has a rimmed flange 62 which is rotatable and axially movable within sleeve 36. The upper face of flange 62 contains a circumferential groove 64 of uniform depth and of such arcuate cross section as will provide a suitable lower race for the balls.

Referring to FIG. 2, the bottom face of upper bearing race 40 has a pair of half circle grooves 66 of identical radius as groove 64 in the lower bearing race 58. Grooves 66 are of the same arcuate cross section as groove 64 but are of varying depth, as shown on FIG. 2 in exaggerated form. The grooves are separated by holes 68, into which stop pins (not shown) are pressed, to act as stops for limiting the rotation of the balls in the grooves 66.

It is noted that, as the lower bearing race is rotated and the balls roll in the grooves, the action is comparable to the helical action of a screw thread and that the axial movement of the lower bearing race will vary with the depth of the balls in grooves 66. This structure will provide a low friction actuating means for obtaining a high axially applied thrust with a minimum amount of applied torque. The thrust-to-torque ratio may be controlled by the pitch of the half circle grooves 66. The pitch may be such as would produce only a few thousandths of an inch axial movement per quarter turn of the lower bearing race.

The rimmed flange 62 of the lower bearing race 58 has a counterbore 70 to receive disc washer springs 72, and counterbore 74 to receive the hub of the spring saddle 76 which extends through the bore of the washer springs.

The spring saddle is bored at the lower end to slidably receive plunger 78, the contained end of which is bored to house ball 80. As the lower bearing race 58 is rotated, springs 72 and spring saddle 76 rotate in unison. The ball 80 provides an anti-friction means for transmitting the axial movement of the rotating spring saddle to the non-rotating plunger 78. The washer springs 72 provide a convenient means for transmitting axial movement from the lower bearing race 58 to the spring saddle 76, while also providing a means for absorbing overtravel, and thereby preventing damage to the elements of the actuator and the valve unit.

All the elements within sleeve 36 may be retained by methods well known to the art, such as snap rings, pins and set screws.

In operation, the lower bearing race 58 is rotated to its axially retracted position within the sleeve 36, after which the actuator is engaged to the valve unit until the valve plug therein is in firm engagement with the valve seat. The lower bearing race of the actuator is then rotated by external wrench means, causing sufficient thrust to be applied through the valve plug to cause the foil on the valve seat to become plasticized in accordance with the disclosure of the referenced application Serial No. 168,558.

It is to be understood that the embodiment of the present invention as shown and described is to be regarded as illustrative only, and that the invention is susceptible to variations, modifications and changes within the scope of the appended claims.

We claim:

1. An actuator with a high thrust to torque ratio for actuating a valve unit having an axially moving valve plug engaging a valve seat, said actuator comprising: a sleeve adapted for joining to the valve unit, an upper bearing race joined to said sleeve and having a plurality of semi-circular arcuate grooves of variable depth on the lower face thereof, a lower bearing race axially movable within said sleeve and having a flange with a circular arcuate groove on the upper face thereof of the same diameter as the semi-circular grooves on the lower face of said upper bearing race and having a hub extending upward from said flange for rotatable actuation by external means, a bearing retainer having a flange rotatably disposed between said upper and lower bearing races, a plurality of balls housed within said bearing retainer and engaging the grooves in said bearing races, and means for translating torque applied to said lower bearing race into axial thrust for forcing the valve plug against the valve seat in the valve unit.

2. An actuator with a high thrust to torque ratio for actuating a valve unit having an axially moving valve plug engaging a valve seat, said actuator comprising: a sleeve adapted for joining to the valve unit, an upper bearing race joined to said sleeve and having a plurality of semi-circular arcuate grooves of variable depth on the lower face thereof, a lower bearing race axially movable within said sleeve and having a flange with a circular arcuate groove on the upper face thereof of the same diameter as the semi-circular grooves on the lower face of said upper bearing race and having a hub extending upward from said flange for rotatable actuation by external means, a bearing retainer having a flange rotatably disposed between said upper and lower bearing races, a plurality of balls housed within said bearing retainer and engaging the grooves in said bearing races, a plunger, a spring saddle axially movable within said sleeve, said spring saddle being bored to slidably receive said plunger, spring means joining said lower bearing race to said spring saddle for resiliently translating torque applied to said lower bearing race into axial thrust on said plunger, said plunger forcing the valve plug against the valve seat in the valve unit.

3. An actuator with a high thrust to torque ratio for actuating a valve unit having an axially moving valve plug engaging a valve seat, said actuator comprising: a sleeve having means at one end adapted for detachably joining to the valve unit, an upper bearing race joined to said sleeve and having a plurality of semi-circular arcuate grooves of variable depth on the lower face thereof, a lower bearing race axially movable within said sleeve and having a flange with a circular arcuate groove on the upper face thereof of the same diameter as the semi-circular grooves on the lower face of said upper bearing race and having a hub extending upward from said flange for rotatable actuation by external means, a bearing retainer having a flange disposed between said upper and lower bearing races and a hub coaxial with the hub on said lower bearing race and radially disposed between the hub on said lower bearing race and a bore through said upper bearing race, a plurality of balls housed within said bearing retainer and engaging the grooves in said bearing races, said bearing retainer and said balls being rotatable, a plunger coaxial with said bearing races and said bearing retainer, a spring saddle axially movable within said sleeve adjacent to said lower bearing race and axially bored at the end adjacent to the valve unit for slidably receiving said plunger, disc spring means joining said lower bearing race to said spring saddle for resiliently translating torque applied to said lower bearing race into axial thrust on said plunger, said plunger forcing the valve plug against the valve seat in the valve unit.

References Cited by the Examiner

UNITED STATES PATENTS

| 2,403,611 | 7/1949 | Ray | 251—253 X |
| 3,160,391 | 12/1964 | Medicus et al. | 251—335 |

FOREIGN PATENTS

| 1,094,544 | 12/1960 | Germany. | |

WILLIAM F. O'DEA, *Primary Examiner.*

ISADORE WEIL, *Examiner.*

D. MATTHEWS, *Assistant Examiner.*